US005945919A

United States Patent [19]

Trask

[11] Patent Number: 5,945,919

[45] Date of Patent: *Aug. 31, 1999

[54] DISPATCHER FREE VEHICLE ALLOCATION SYSTEM

[75] Inventor: Matthew M. Trask, San Jose, Calif.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,688

[22] Filed: May 30, 1996

[51] Int. Cl.[6] .................................. I08B 5/22; B60Q 1/00; G07B 15/02; H04Q 19/02

[52] U.S. Cl. .................................... 340/825.491; 235/384; 340/438; 340/825.28

[58] Field of Search ......................... 340/825.49, 825.31, 340/825.06, 539, 573, 825.54, 825.69, 825.72; 307/10.2; 342/450, 457, 465; 180/287

[56] References Cited

U.S. PATENT DOCUMENTS 4,831,539 5/1989 Hagenbuch ............................. 364/449

5,223,844 6/1993 Mansell et al. ......................... 342/357

*Primary Examiner*—Michael Horabik
*Assistant Examiner*—Anthony A. Asongwed
*Attorney, Agent, or Firm*—Wagner Murabito & Hao

[57] ABSTRACT

A system and method for dispatcher free vehicle allocation. In one embodiment, the present dispatcher free vehicle allocation (DFVA) system includes a plurality of mobile service providers (vehicles). Each of the vehicles is communicatively linked to DFVA computer system. Each of the vehicles contain a position determining system adapted to determine the present position of each the vehicle. Each of the vehicles communicates its present position to the DFVA system. The DFVA system is adapted to track the present location of each vehicle. The DFVA system answers dispatch requests for service from customers within the operational area. The DFVA system then determines a most appropriate vehicle of the plurality of vehicles, to respond to the customer's dispatch request. The present DFVA system then transfers the customer to the driver of the most appropriate vehicle.

21 Claims, 8 Drawing Sheets

DISPATCHER FREE VEHICLE ALLOCATION SYSTEM

TECHNICAL FIELD

This invention relates to vehicle tracking and dispatch systems. Specifically, the present invention relates to a dispatcher free vehicle allocation system.

BACKGROUND ART

Services and response from mobile service providers has become a fact of life in most metropolitan areas of the U.S. These mobile services providers make available in their operational areas a broad range of services to customers. The offered services include taxis, ambulance, fire, maintenance, security, law enforcement, and the like.

A vehicle dispatch system is used to arrange for the efficient allocation of available mobile service providers. In a taxi service, for example, the customers requiring transportation are matched with available vehicles in the taxi fleet. Available vehicles are allocated in such a manner as to maximize the volume of service the system is able to provide, while minimizing the delay from a customer request to service delivery. Currently, vehicle dispatching is accomplished using a traditional central dispatching system.

In a traditional dispatch system, a fleet of vehicles is dispersed in an operating area. The position of each of the vehicles is tracked at a manned central base. A dispatcher, or dispatchers, at the central base control the allocation and use of the vehicles in the fleet. Typically, the central base dispatcher monitors and communicates with the vehicles at frequent intervals. In most dispatch systems, the position of each of the vehicles is superimposed over a simplified map. This provides the dispatcher with a graphical display of the position of each of the vehicles with respect to the underlying map of the operational area. Hence, traditional dispatch systems require a central base infrastructure sufficient to provide a working environment, i.e. office space, for at least one dispatcher. Furthermore, traditional dispatch systems require enough office space to accommodate bulky equipment for monitoring and communicating with the fleet of vehicles. Such equipment includes, for example, maps, grease boards, graphical displays, and the like. Thus, traditional dispatch systems require not only personnel, i.e. dispatchers, but also require significant office space.

The dispatcher, in addition to tracking the position of each of the fleet vehicles, must know where to dispatch a vehicle when service is requested. The dispatcher must know the location of the caller. The geographic position of the caller may be obtained, for example, by an automatic number identification/automatic location identification (ANI/ALI) system used in conjunction with a geographically indexed data base or geo-file. By accessing an AVL system, the dispatcher is able to visually determine which of the displayed vehicles is positioned near or nearest to the location of the caller. If the above geographic locations systems are not available, the dispatcher must determine the caller's location verbally, by conversing with the caller. The dispatcher then decides which available vehicle, out of the fleet of vehicles, can most quickly respond to the caller's request. The dispatcher may also be required to take into account vehicle impeding barriers, such as traffic jams, road construction, geographic features, and the like. Furthermore, the dispatcher may be required to consider the relative skills and experience levels of the operators of the vehicles. Such dispatcher decisions must be made within moments of receiving the dispatch request.

Due to the number of variables present in the allocation and dispatching process, dispatchers frequently make errors. That is, dispatchers dispatch a vehicle which is not the nearest or the fastest responding vehicle. Such errors occur even when the dispatchers are aware of geographic and or vehicle impeding barriers present at or near the reported event. The occurrence of errors is increased when dispatch decisions are made under rigorous time constraints. Hence, even well trained dispatchers may mistakenly dispatch the wrong vehicle or a slower responding vehicle to a reported event. Such mistakes can adversely affect profitability in commercial applications, and can cost lives in emergency vehicle response applications.

Thus, a need exists for a system which swiftly and automatically dispatches the most appropriate of a plurality of vehicles to a dispatch request. A further need exists for a dispatch system which does not require the personnel and office space associated with traditional dispatch systems.

DISCLOSURE OF THE INVENTION

A system and method for dispatcher free vehicle allocation is disclosed. In one embodiment, a dispatcher free vehicle allocation (DFVA) system of the present invention swiftly and automatically recommends which of a plurality of vehicles can respond most quickly to an event. The DFVA system includes a plurality of mobile service providers, such as, for example, vehicles. The position of each of the vehicles is communicated to the DFVA computer system. The DFVA system then tracks the present position of each of the vehicles.

The DFVA system is adapted to receive customer dispatch requests. The present DFVA system automatically answers the request, and then examines both the location and the status of each vehicle in the fleet. The DFVA system compares the location of each vehicle with the location of the customer. The DFVA system determines a most appropriate vehicle to dispatch. Next, the DFVA system transfers the customer requesting the dispatch to the driver of the most appropriate vehicle. In so doing, the present DFVA system places the customer in direct contact with the driver. This provides for effective and efficient allocation of available mobile service providers.

Thus DFVA system of the present invention swiftly and automatically dispatches the most appropriate of a plurality of vehicles to an event. The present invention further eliminates the need for personnel and office infrastructure associated with traditional dispatch systems.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
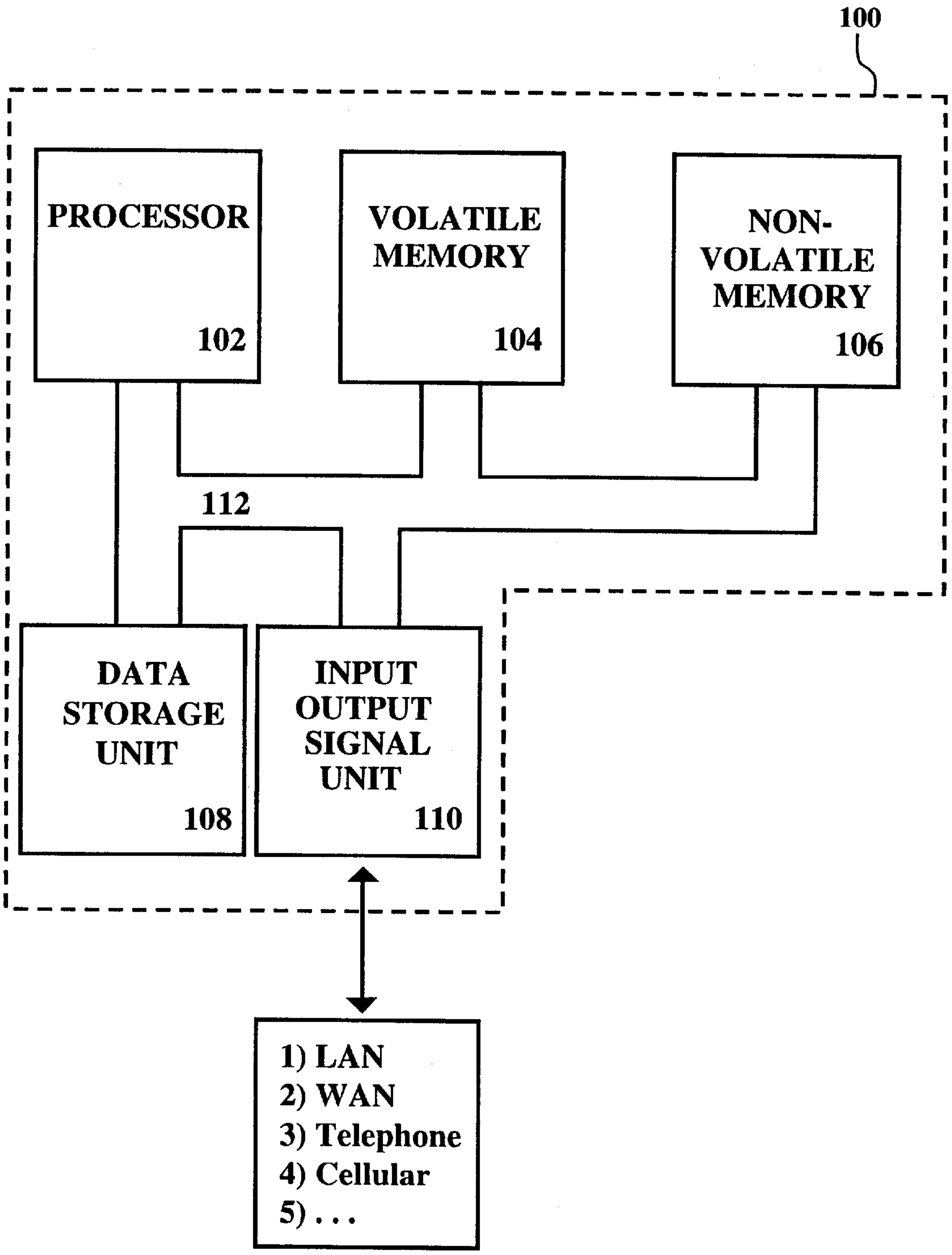
FIG. 1 is a block diagram of the DFVA system in accordance with the present claimed invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, and the like, is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" , "answering", "examining", "determining", "transferring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Referring to FIG. 1, portions of the present dispatcher free vehicle allocation system are comprised of computer executable instructions which reside in a computer system 100. FIG. 1 illustrates an exemplary computer system 100 used as a part of a dispatcher free vehicle allocation system (DFVA) in accordance with the present invention. In the present embodiment, the DFVA system has automatic vehicle tracking, allocation, and dispatch capabilities. This allows the DFVA system to track, monitor, allocate, and dispatch each of a plurality of mobile service providers, e.g. vehicles. It is appreciated that the DFVA system of FIG. 1 is exemplary only and that the present invention can operate within a number of different computer systems, including general purpose computer systems, embedded computer systems, and stand alone computer systems specially adapted for vehicle tracking and dispatch.

DFVA system of FIG. 1 includes an address/data bus 112 for communicating information, a central processor unit 102 coupled to bus 112 for processing information and instructions. The DFVA system also includes data storage features such as volatile 104 and non-volatile 106 memory coupled to bus 112 for storing information and instructions for central processor unit 102. A data storage unit 108 (e.g., a magnetic or optical disk and disk drive) is coupled to bus 112 for additional storage of information and instructions. An input/output signal unit 110 is coupled to bus 112 for communication with other systems, including computer systems, wireless local area networks (LAN)/wide area networks (WAN), or conventional land line telephone systems.

GENERAL DESCRIPTION OF DISPATCH FREE TRACKING AND ALLOCATION PROCESS OF THE PRESENT INVENTION

The following detailed description will begin with a brief overview of the steps performed by the present DFVA system. The detailed description will then continue with a detailed discussion of each of the steps performed by the present DFVA system.

Figure 2:
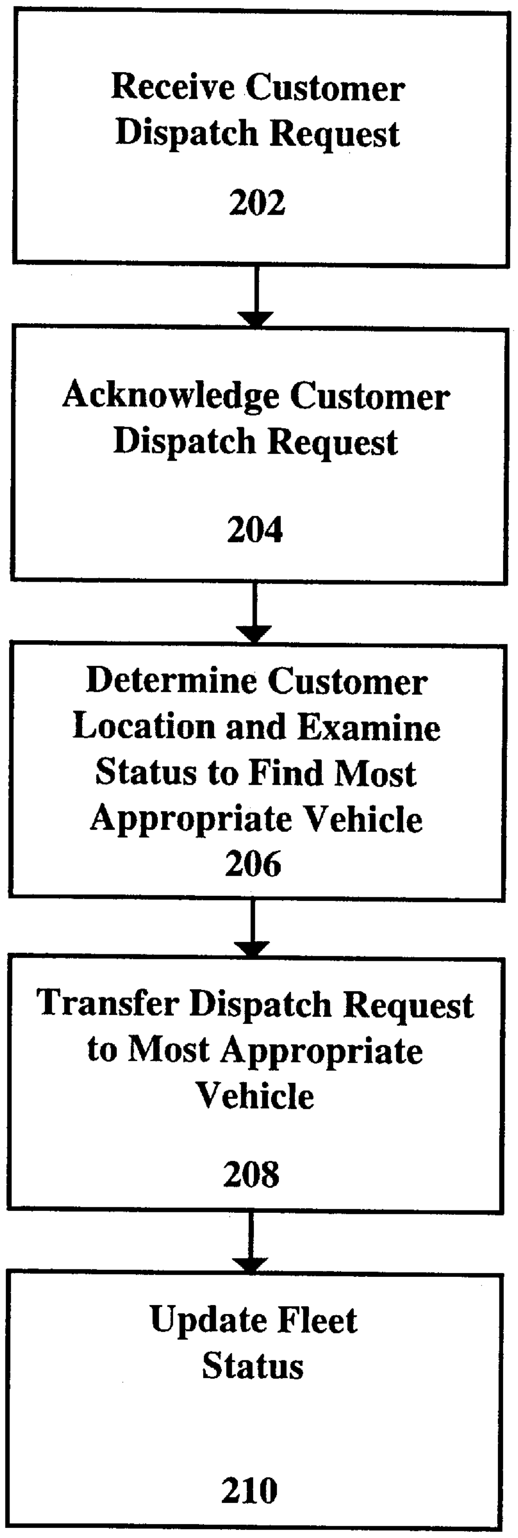
FIG. 2 is a flow chart of the steps used in the dispatcher free vehicle allocation (DFVA) system in accordance with the present invention.

With reference next to FIG. 2, a flow chart of the steps performed by the DFVA system of the present invention is shown. As shown in step 202, in the present invention, the DFVA system receives a dispatch request for service from a customer. The customer typically contacts the DFVA system through the telephone system, including either conventional land line or cellular telephone systems.

Next, in step 204, the DFVA system acknowledges the customer's dispatch request. In one embodiment, the DFVA system, automatically answers and informs the customer that the request is being processed. The present DFVA system may also prompt the customer for additional information about either the customer or the customer's dispatch request. Therefore, the present invention eliminates the need for a dispatcher, or dispatchers, to answer incoming dispatch requests.

Referring next to step 206 of the present invention, the DFVA system determines the location of the customer and examines the status of each vehicle in the fleet. Additionally, if necessary, the present DFVA system also accesses any special information about the customer gathered in step 204. In so doing the present DFVA system determines the most appropriate (i.e., the fastest responding) vehicle to dispatch. Again, the present invention accomplishes the above described task without requiring a dispatcher.

Referring next to step 208 of the present DFVA system, the present invention now transfers the dispatch request to the most appropriate vehicle. Hence, the present DFVA automatically places the customer in direct contact with the driver of the vehicle which is able to respond most quickly to the customer's dispatch request. Moreover, the customer is transferred to the driver of the most appropriate vehicle without any dispatcher intervention.

In step 210 of the present DFVA system, the present invention updates the status of the fleet of vehicles. In the present embodiment, the selected vehicle reports that it is responding to the dispatch request. The DFVA system updates that vehicle's status, recognizing that it is no longer available to respond to another dispatch request. Thus, the present DFVA system maintains an updated status for the fleet of vehicles. Therefore, the present invention provides a dispatcher free vehicle allocation system. A detailed description of steps 202, 204, 206, and 210 of FIG. 2 is found below.

Figure 3:
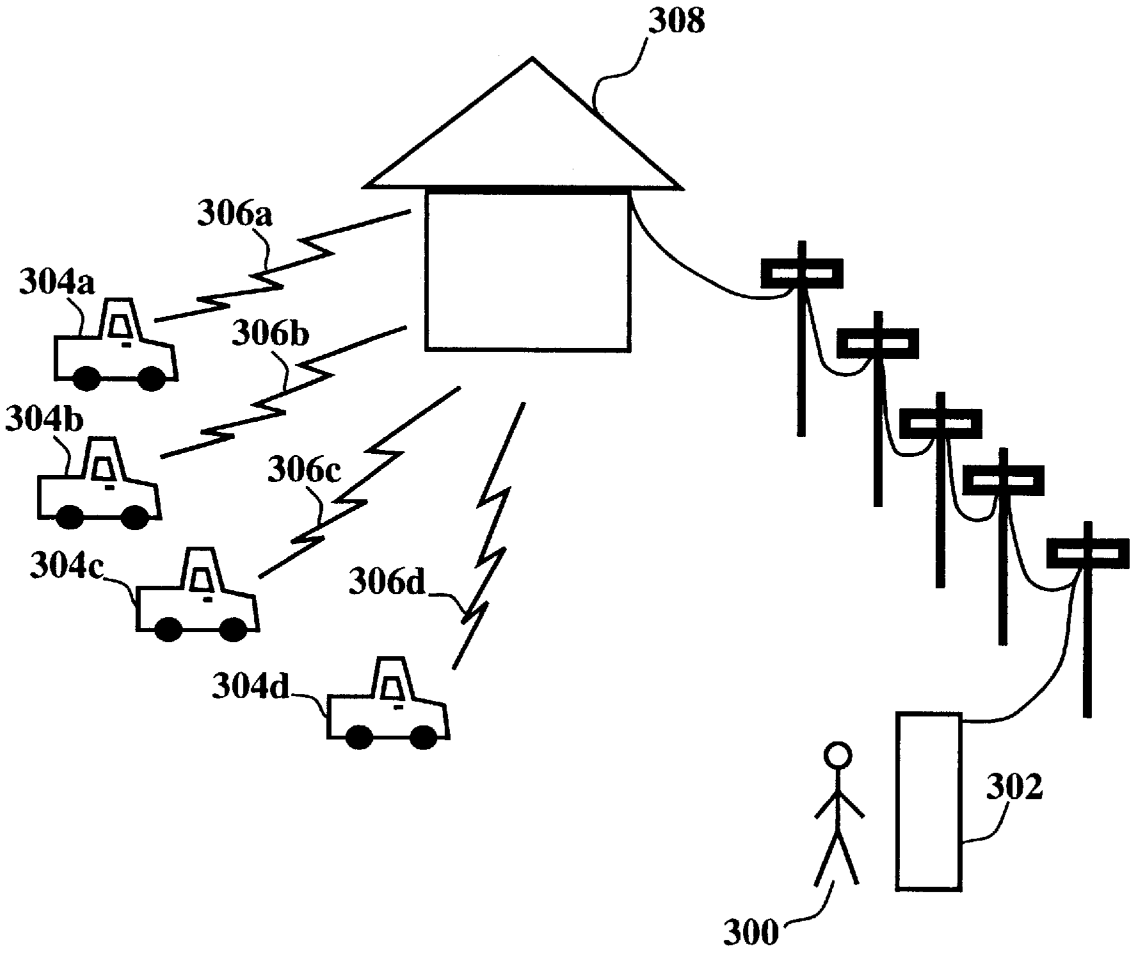
FIG. 3 is a schematic diagram of a system in accordance with the present claimed DFVA system.

With reference now to FIG. 3, a schematic diagram illustrating a customer dispatch environment is shown. In the embodiment of FIG. 3, a customer 300 is calling from a phone booth 302 to request a taxi. The phone booth is wired conventionally into the telephone network. In the present invention, the DFVA system answers the customer's taxi dispatch request. The present DFVA system is also well suited to receiving customer dispatch requests through cellular or other communication devices in addition to conventional land line. As shown in FIG. 3, several taxis 304*a*–304*d* are communicatively coupled to the central base 304 via communication links 306*a*–306*d* respectively.

In the present embodiment, the DFVA system is located in a central base 308. The present DFVA system is also well suited to being mobile. For example, the present invention is well suited to having the DFVA system disposed within a vehicle, thereby eliminating the central base 308. Similarly, the present invention is well suited to having the DFVA system disposed within one of the plurality of taxis 304*a*–304*d*.

The present invention is well suited to being used with various types of vehicles, and with various sized fleets of vehicles. Finally, although the following discussion specifically recites the use of the present DFVA system in conjunction with a taxi service, it should be appreciated that the present invention is applicable to a variety of mobile service providing systems. Such mobile service providing systems include emergency response vehicles such as fire or and law enforcement, commercial transport vehicles such as van pools or limousines, or private use vehicles such as product delivery trucks. Likewise, present invention is well suited to being used in large metropolitan areas, or in rural areas. The detailed configuration of each vehicle is described in detail below.

Figure 4:
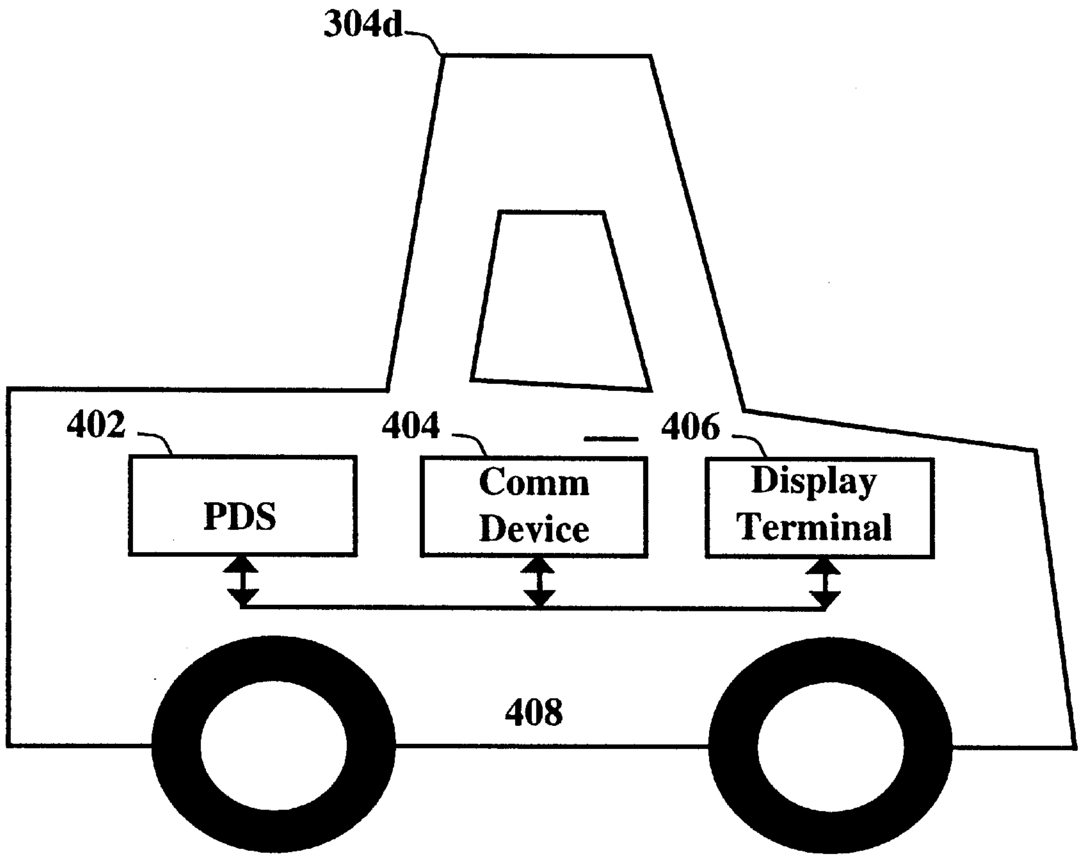
FIG. 4 is a flow chart of steps used to acknowledge the customer's dispatch request in accordance with the present claimed DFVA system.

With reference to FIG. 4, a taxi compatible with the DFVA system of the present invention is shown. Each of the plurality of taxis 304*a*–304*d* is equipped with a position determining system 402, a com device 404, and an optional display terminal 406. In the present embodiment, the position determining system is a GPS based system (Global Positioning Satellite), or a combined GPS and dead reckoning system to improve accuracy. However, the present invention is also well suited to use with any of numerous other types of position determining systems. Position determining system 402 relays position information to the com device 404 over a bus 408.

With reference again to FIG. 3, communication links 306*a*–306*d* communicatively couple taxis 304*a*–304*d*, respectively, to central base 308. In the present embodiment communication links 306*a*–306*d* are established in one of many ways. For example, communication links 306*a*–306*d* can be established using a Metricomm Wide Area Network (WAN) links operating at approximately 900 MHz. Communication links 306*a*–306*d* can be established using a standard cellular telephone connection. Communication links 306*a*–306*d* can also be established using a trunked radio system. In such a system, for example, corn device 404 of FIG. 4 disposed in taxi 304*d* in FIG. 3 first contacts the DFVA system and is assigned a communication channel. The DFVA system then knows that communication between com device 404 and the DFVA system must take place over the assigned channel. Communication link 306*a*–306*d* can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, and com device 404 is assigned a channel. The DFVA system then bursts packet data, using, for example, TCP/IP protocol, to deliver the data to corn device 404 until the data is completely transmitted or until the channel is no longer free. If the data is not completely transferred when the channel expires, communication link 306*d* is then established using a different channel. As yet another example, communication links 306*a*–306*d* can be established using a Subscription Mobile Radio (SMR) system wherein corn device 404 has an assigned frequency for communication links 306*a*–306*d*. The present invention is also well suited to having an rf communication links between com device 404 and the present DFVA system.

Additionally, in the embodiment of FIG. 3, the customer is the person making the dispatch request. The present invention is also well suited to receiving the dispatch request from a third person. For example, a caller can request service for a person located separately from the caller. Similarly, the present DFVA system is also well suited to answering dispatch requests for service needed at a different time. For example, the present invention can answer a caller who wants a taxi later in the day.

Figure 5:
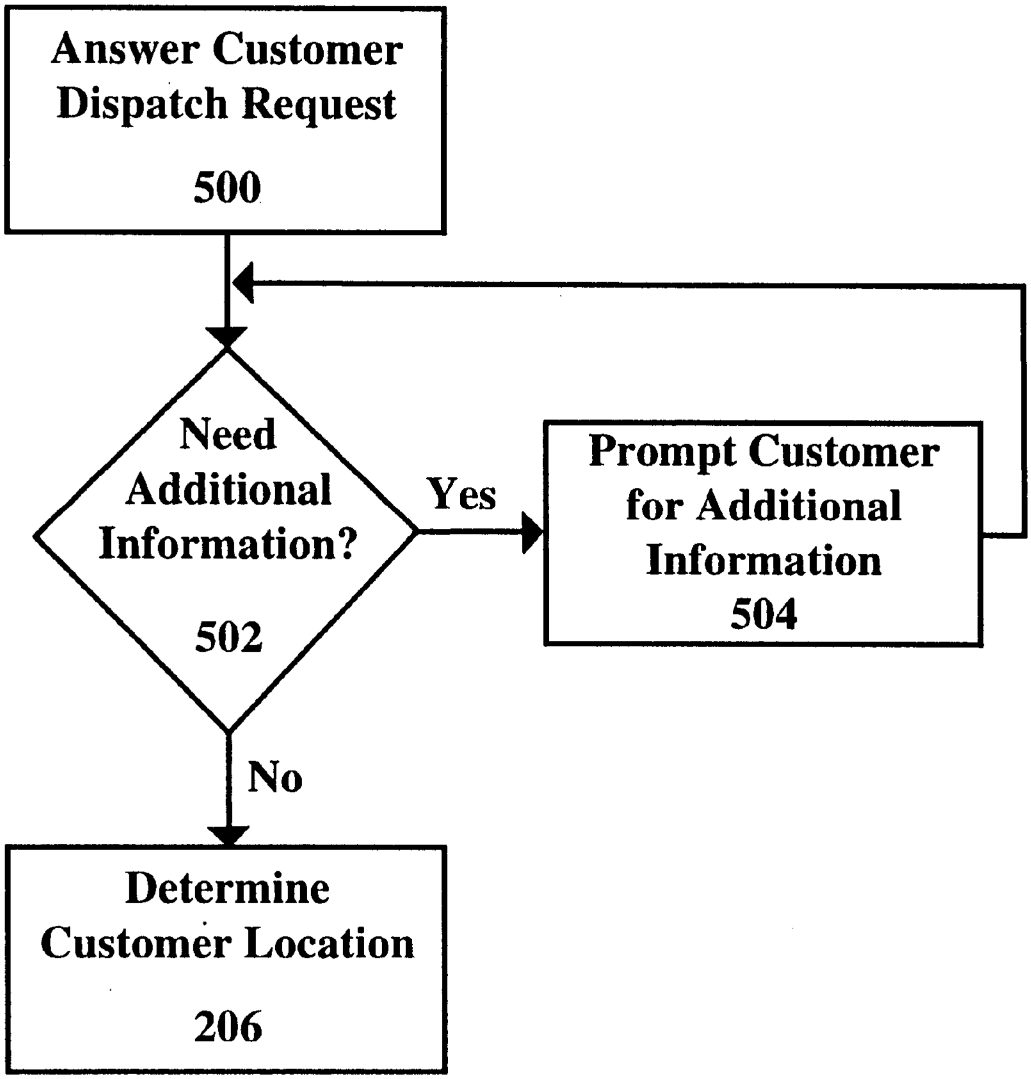
FIG. 5 is a flow chart of the steps used to determine customer location and examine fleet status in accordance with the present claimed DFVA system.

With reference now to FIG. 5, a flow chart illustrating steps performed during the acknowledgment step 204 of FIG. 2 is shown. In step 500, the present DFVA system automatically answers the customer and informs the customer that his/her dispatch request is being processed. The answering is achieved in the present embodiment using automated answering techniques well known in the prior art. In the present embodiment, the DFVA system of the present invention responds to the customer's telephone call with a voice massage stating for example, "Please wait, your call is being transferred to the nearest available taxi." As shown in steps 502 and 504, the present DFVA system will also prompt the customer for additional information, if needed. In the present embodiment, the requests for additional information is gathered through a series of menus. For example, the present DFVA system will prompt the customer with "press 1 if you require immediate transportation." It will be understood that the present invention is well suited to prompting the customer with any of numerous other messages. Once sufficient information is obtained, the DFVA system of the present invention proceeds to step 206 of FIG. 2.

Figure 6:
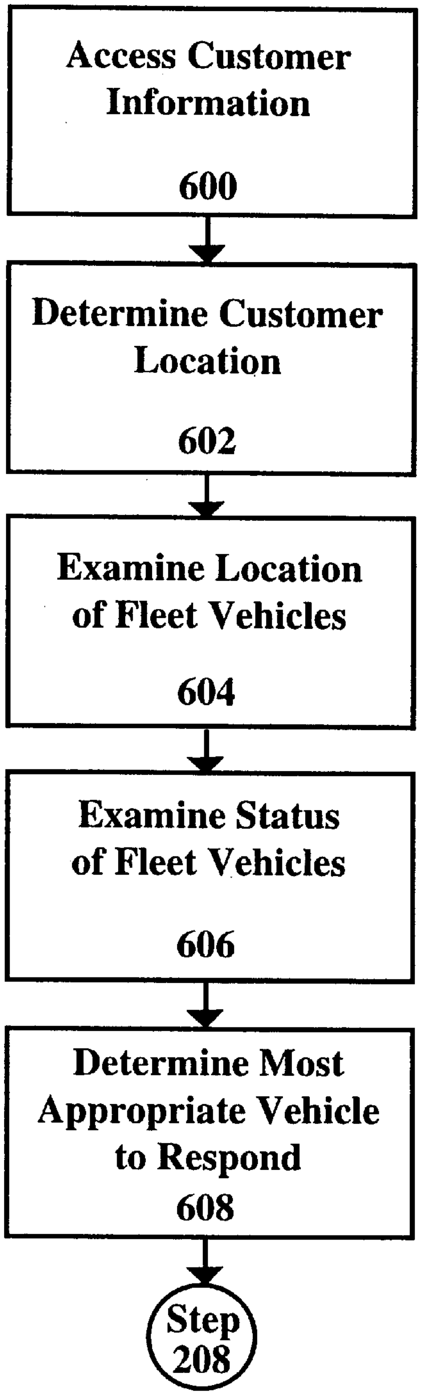
FIG. 6 is a schematic diagram of a vehicle used in accordance with the present claimed DFVA system.

With reference next to FIG. 6, a flow chart of the determination and examination step 206 of FIG. 2 is shown. As shown in step 600, in the present embodiment, customer information is accessed and used to set parameters used by the present DFVA system. For example, factors such as when the customer wishes to have service dispatched, whether the customer is calling to arrange service for a third party, and the like, are considered to insure that the most appropriate vehicle is ultimately dispatched.

Referring now to step 602, the present DFVA system determines the location of the caller. The geographic location of the caller may be obtained by the DFVA, for example, through an automatic number identification/automatic location identification (ANI/ALI) system used in conjunction with a geo-file. The geo-file is typically a database file containing geographic region attribute information. The geographic attribute information includes such items as, for example, vector street map information, jurisdictional areas and boundaries, hydrographic features, railways, callbox locations and the like. Additionally, the DFVA system of the present invention can include an automatic vehicle recommendation (AVR) system which can be used to determine the nearest/fastest responding vehicle in relation to the location of the caller. The AVR system would take into account street map information, hydrographic features, railways, and the like, when recommending the nearest/fastest responding vehicle. A more detailed description of automatic vehicle recommendation techniques compatible with the present invention can be found in U.S. patent application Ser. No. 08/607,468 to Froeburg, et.al., filed Feb. 27, 1996 entitled "Automated Vehicle Recommendation System." The Froeburg Application is incorporated herein by reference.

If no automated geo-file information is available, the DFVA system can prompt the caller for location information. This location information can consist of the telephone number prefix, the telephone number of the phone booth from which the caller is dialing, nearest street name and address number, landmarks, and the like. The caller may enter this information by voice or by using the telephone keypad. If none of this information is available (for example, a foreign tourist who is not sure of his/her location, with a cellphone which does not provide location data) the DFVA system is able to connect the caller with the driver of an available vehicle for direct verbal interaction. The driver then determines the caller's location as precisely as possible and inputs this information into the DFVA system, or proceeds to pick up without input.

In step 604, the present DFVA system examines the location of the vehicles in the fleet. The location of each vehicle in the fleet is determined through communication between the DFVA system and position determining system 602 disposed in each vehicle. Thus, the present DFVA system is able to determine the location of each of taxis 304*a*–304*d* of FIG. 3. Next, in step 606, the DFVA system examines the status of each of taxis 304*a*–304*d*.

As shown in step 606, the present invention now determines the status of each taxi. In the present embodiment, each of taxis 304*a*–304*d* communicates its status to the DFVA system. Taxi status information can include whether the taxi is responding to a dispatch, whether the taxi has a customer on board, fuel and maintenance information of the taxi, and the like.

As shown in step 608, the present DFVA system now determines a most appropriate available taxi to respond to the dispatch request. The DFVA system considers taxi status information when determining availability. For purposes of the present application, an available taxi is a taxi which is able to respond to a dispatch from the DFVA system. For example, although a taxi might be located very near to requesting customer, that taxi may already have a fare onboard.

The present DFVA then compares the position of all available taxis with the location of the customer and determines which of the vehicles can respond most quickly to the location of the customer. Although a first taxi in the fleet may appear to be physically closer to the location of the customer than a second taxi in the fleet, a vehicle impeding barrier may exist between the first taxi and the customer's location. The vehicle impeding barrier can be, for example, a building, a river, a one way street, and the like. Thus, even though the first taxi is physically closer to the customer, the second taxi is able to more quickly respond. The DFVA system recognizes vehicle impeding barriers and other geographic features and is able to determine which of a plurality of taxis can respond most quickly to a dispatch request. This advantage of the present DFVA invention is especially apparent in an environment containing complex geographic features. Such environments include, for example, large metropolitan areas such as San Francisco, New York, Los Angeles, Boston, and the like. Furthermore, in applications involving emergency response vehicles, the DFVA system of the present invention determines which vehicle to dispatch completely unaffected by any pressure associated with handling life threatening events. That is, the present DFVA system eliminates error prone human dispatcher decisions.

Figure 7:
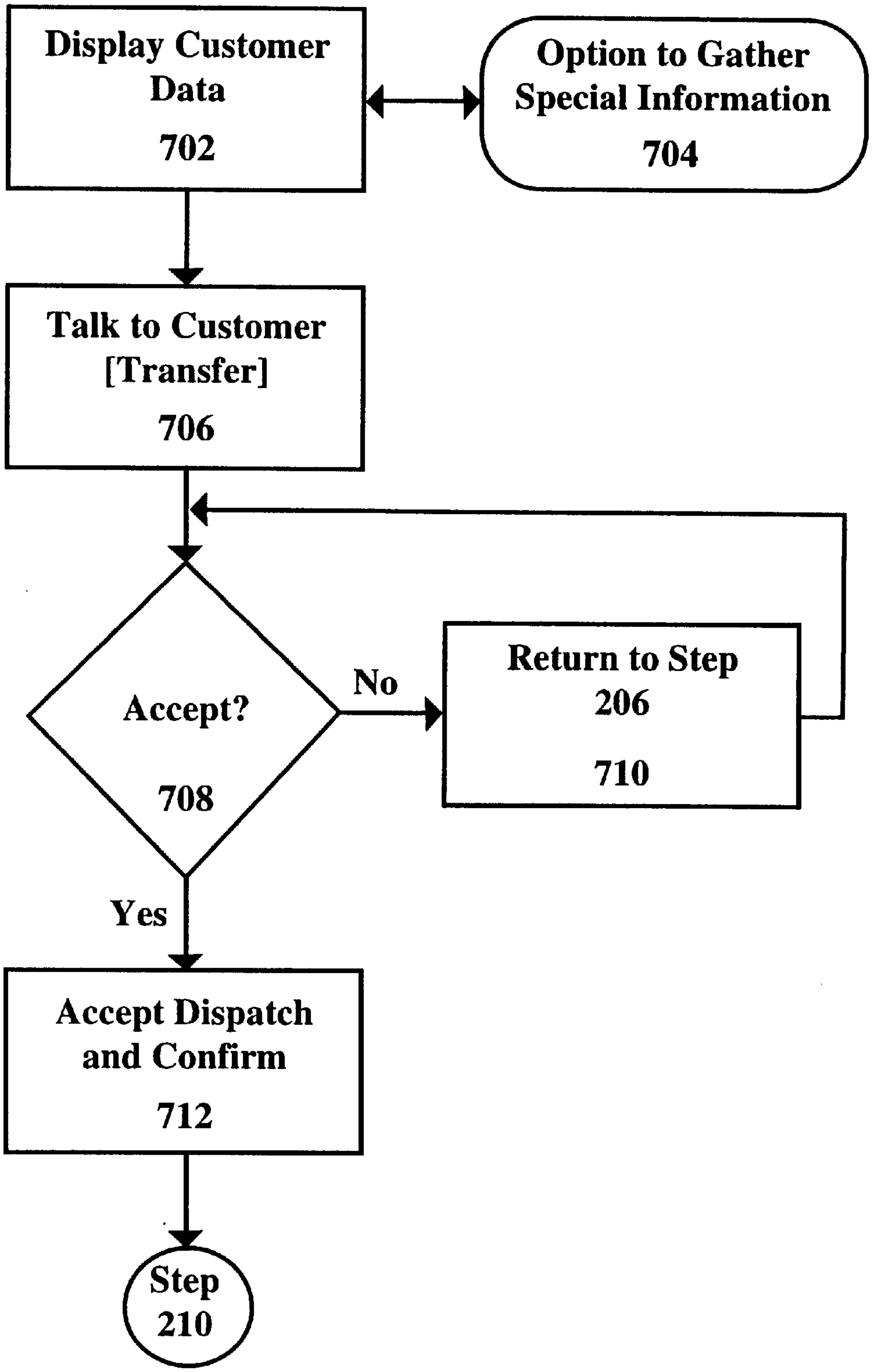
FIG. 7 is a flow chart of the steps used to transfer a customer dispatch request to a most appropriate vehicle in accordance with the present claimed DFVA system.

With reference next to FIG. 7, a flow chart of the steps used to perform the transfer dispatch request step 208 of FIG. 2 is shown. In the present DFVA system, the customer is communicatively transferred to the driver of the most appropriate vehicle. In step 702, customer data is displayed to the driver of the most appropriate vehicle via display terminal 406 of FIG. 4. The displayed data includes the caller's phone number, address, location, and any other special information. In step 704 of the present invention, the driver has the option of gathering any such special information about the customer. Next, in step 706, the driver verbally confirms directions, pickup time, or other special information. This information can include customer unique information, such as, for example, a particular route the customer wishes to follow, or geographic information not in the DFVA system's geo-files, such as newly completed housing, new addresses, and the like. In step 708, the driver has the option of confirming or refusing the dispatch. When the dispatch is refused, as shown in step 710, the DFVA system returns to step 206 of FIG. 2 and determines the next most appropriate vehicle. When the dispatch is accepted as shown in step 712, the dispatch is confirmed with the present DFVA system, and step 210 is initiated, such that the status of the fleet is updated.

Figure 8:
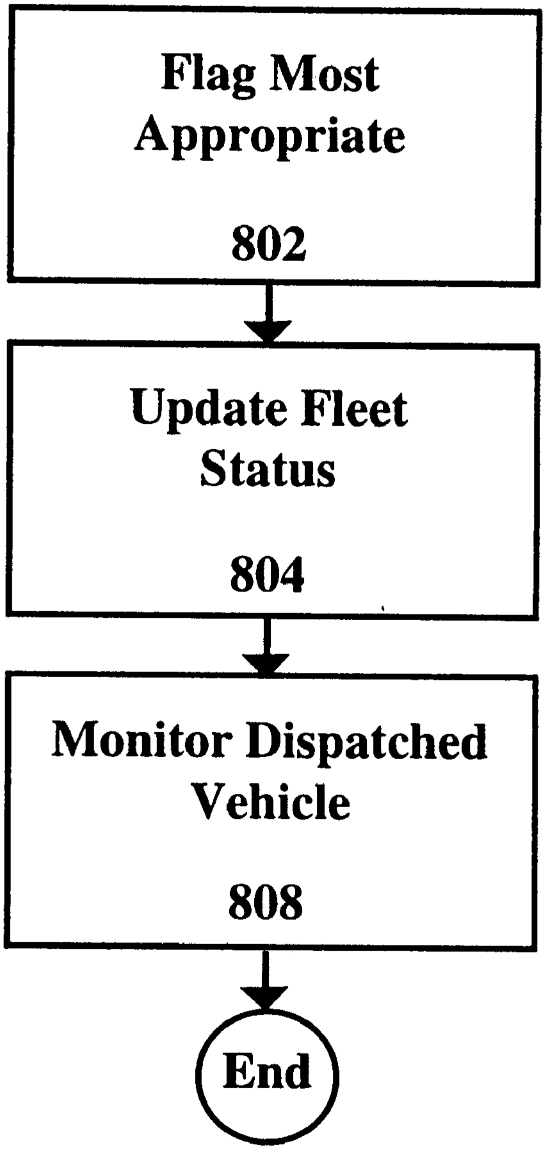
FIG. 8 is a flow chart of the steps used to update the status of a fleet of vehicles accordance with the present claimed DFVA system.

With reference next to FIG. 8, a flow chart of the steps used during step 210 of FIG. 2 is shown. In the present DFVA system, when the most appropriate vehicle confirms the dispatch, the DFVA system recognizes that the most appropriate vehicle is no longer available to respond to subsequent dispatch requests. In step 802, The DFVA system flags the most appropriate vehicle dispatched. The DFVA system then updates the fleet status to reflect the dispatch underway, as shown in step 804. Next, in step 808, the dispatched vehicle is monitored by the DFVA system, with additional information concerning the dispatch, such as fee, estimated time of arrival, and estimated time to completion, continuously updated.

Thus, a system and method for dispatcher free vehicle allocation is disclosed. The present invention swiftly and automatically dispatches the most appropriate of a plurality of vehicles to an event. The present invention further eliminates the need for personnel and office infrastructure associated with traditional dispatch systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A system for dispatcher free vehicle allocation comprising:

a plurality of vehicles; and a dispatcher free vehicle allocation (DFVA) system communicatively coupled to said plurality of vehicles, said DFVA system not requiring a manned central base or dispatcher personnel, said DFVA system determining the present location of each of said plurality of vehicles, said DFVA system including provision for receiving a dispatch request from a customer for one of said plurality of vehicles, said DFVA system determining a most appropriate vehicle of said plurality of vehicles and transferring said customer to said most appropriate vehicle of said plurality of vehicles such that said customer is transferred to said most appropriate vehicle without requiring intervention by said manned central base and without requiring intervention by said dispatcher personnel.

2. The system of claim 1 wherein said plurality of vehicles have disposed therein a position determining system, said position determining system communicatively coupled to said DFVA system.

3. The system of claim 2 wherein said position determining system is a GPS based position determining system.

4. The system of claim 1 wherein said plurality of vehicles is selected from the group consisting of emergency response vehicles, commercial transport vehicles, and private use vehicles.

5. The system of claim 1 wherein said DFVA system is at a fixed geographic location.

6. The system of claim 1 wherein said DFVA system is mobile.

7. The system of claim 6 wherein said DFVA system is disposed within one of said plurality of vehicles.

8. The system of claim 1 wherein said DFVA system is adapted to determine a geographic location of said customer and compare said geographic location of said customer with a present location of each of said plurality of vehicles such that said DFVA system automatically transfers said dispatch request to said most appropriate vehicle.

9. A computer implemented method for dispatcher free vehicle allocation comprising the computer implemented steps of:

receiving a request from a caller at a dispatcher free vehicle allocation system to dispatch a vehicle to a customer;

automatically answering said request from said caller, said request automatically answered by a dispatcher free vehicle allocation system, said dispatcher free vehicle allocation system not requiring a manned central base or dispatcher personnel;

examining a status of a fleet of vehicles;

determining a most appropriate vehicle from said fleet of vehicles; and transferring said request to said most appropriate vehicle by establishing a communication link between said caller and said most appropriate vehicle such that said customer is transferred to said most appropriate vehicle without requiring intervention by said manned central base and without requiring intervention by said dispatcher personnel.

10. The computer implemented method of claim 9 wherein said step of examining the status of said fleet of vehicles further includes receiving vehicle location and status information from said fleet of vehicles.

11. The computer implemented method of claim 9 wherein said step of transferring said request further includes displaying said customer's location and status information in said most appropriate vehicle.

12. The computer implemented method of claim 9 wherein said step of determining a most appropriate vehicle is comprised of:

determining a geographic location of said customer; and, comparing said geographic location of said customer with a present location of each of said available vehicles.

13. A computer-usable medium having computer-readable program code embodied therein for causing a computer to perform the steps of:

receiving a request from a caller at a dispatcher free vehicle allocation system to dispatch a vehicle to a customer;

automatically answering said request from said caller, said request automatically answered by said dispatcher free vehicle allocation system, said dispatcher free vehicle allocation system not requiring a manned central base or dispatcher personnel;

examining a status of a fleet of vehicles to select available vehicles;

determining a most appropriate vehicle from said available vehicles; and transferring said caller to said most appropriate vehicle by establishing a communication link between said caller and said most appropriate vehicle.

14. The computer-usable medium having computer-readable program code embodied therein of claim 13 wherein said step of examining the status of said fleet of vehicles further includes receiving vehicle location and status information from said fleet of vehicles.

15. The computer-usable medium having computer-readable program code embodied therein of claim 14 wherein said step of transferring said request further includes displaying said customer's location and status information in said most appropriate vehicle.

16. The computer-usable medium having computer-readable program code embodied therein of claim 14 wherein said step of determining a most appropriate vehicle is comprised of:

determining a geographic location of said customer; and, comparing said geographic location of said customer with a present location of each of said available vehicles.

17. A system for dispatcher free vehicle allocation comprising:

a plurality of vehicles; and a mobile dispatcher free vehicle allocation (DFVA) system communicatively coupled to said plurality of vehicles, said mobile DFVA system not requiring a manned central base or dispatcher personnel, said mobile DFVA system determining the present location of each of said plurality of vehicles, said mobile DFVA system including provision for receiving a dispatch request from a customer for one of said plurality of vehicles, said mobile DFVA system determining a most appropriate vehicle of said plurality of vehicles and transferring said customer to said most appropriate vehicle of said plurality of vehicles such that said customer is transferred to said most appropriate vehicle without requiring intervention by said manned central base and without requiring intervention by said dispatcher personnel.

18. The system of claim 17 wherein said mobile DFVA system is disposed within one of said plurality of vehicles.

19. The system of claim 17 wherein said plurality of vehicles have disposed therein a position determining system, said position determining system communicatively coupled to said mobile DFVA system.

20. The system of claim 17 wherein said position determining system is a GPS based position determining system.

21. The system of claim 17 wherein said plurality of vehicles is selected from the group consisting of emergency response vehicles, commercial transport vehicles, and private use vehicles.

* * * * *